United States Patent Office 3,197,788
Patented Aug. 3, 1965

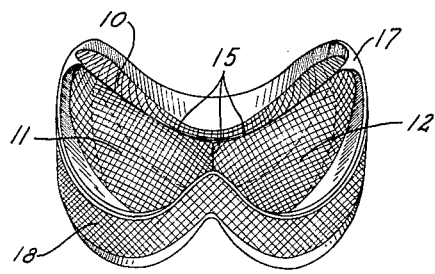
FIG_1_
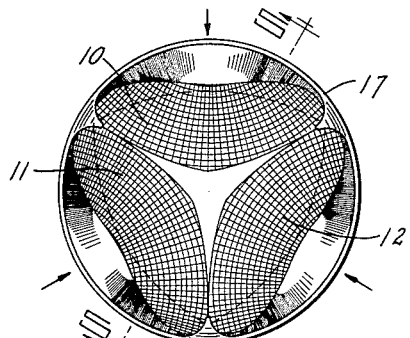
FIG_4_
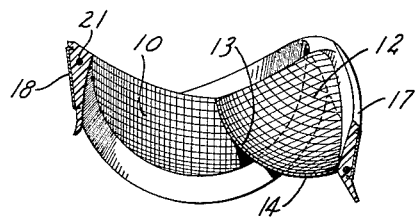
FIG_2_
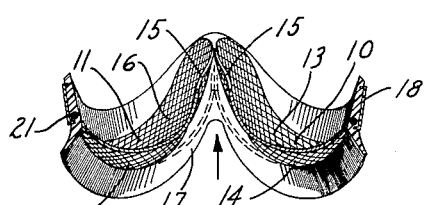
FIG_5_
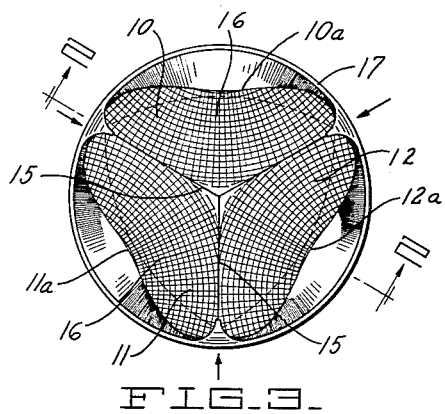
FIG_3_
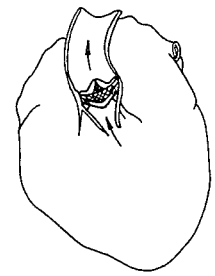
FIG_6_
INVENTOR.
Franz-Josef Segger.
BY
ATTORNEYS.

3,197,788
PROSTHETIC VALVE FOR CARDIAC SURGERY
Franz-Josef Segger, San Francisco, Calif., assignor to The Institute of Medical Sciences, a non-profit corporation of California
Filed Apr. 23, 1962, Ser. No. 189,399
1 Claim. (Cl. 3—1)

This invention relates to a prosthetic valve for cardiac surgery to replace a diseased aortic valve.

When the aortic valve is diseased and not responsive to conventional treatment, it is desirable that it be removed by surgery and replaced. This invention relates to such replacement valve. Other devices have been used with varying degrees of success but those with which I am familiar have each had some failures or disadvantages.

The obvious inherent problems lie in five general areas; anotomy, physiology, design, materials, and techniques of insertion.

Such a valve, despite the number of different sizes which must be prepared to provide a valve for varying sizes of annuluses, must be adapted to anatomical differences and pathological changes in the sites of fixation, that is, of the anatomical valve ring.

It is an object of this invention to provide such a device which readily adapts itself to the aortic annulus and which further supports the annulus, thus preventing it from further dilatation which, in certain diseases, is the reason for a mal-functioning valve.

It is a further object of this invention to provide a device which utilizes the growth of the surrounding tissue to assist its support.

It is a further object of this invention to provide a prosthetic valve which, in its design, resembles as nearly as possible the valve it replaces, this valve being prefabricated and having no mechanical deficiencies. Preferably the valve must be supplied in shapes and sizes suitable for easy placement in any of a plurality of different sized aortic annuluses.

It is a further object of this invention to provide a prosthetic valve having passively acting and moving cusps adapted to open primarily in response to the flow of blood and secondarily in response to the muscular activity of the annulus.

Such a valve must present the minimum restriction to the flow of blood and therefore it is a further object of this invention to provide a valve construction of such size and design that it presents the minimum obstruction in the aorta and where parts are so resilient that they offer the minimum resistance to the flow of blood from the heart to the aorta.

It is a further object of this invention to provide a valve which is normally closed when there is no force to open it, whereby the return flow of blood to the heart is prevented.

It is a further object of this invention to provide a prosthetic valve which is so designed that it provides a cone-shaped ring which conforms to the normal shape of the aortic root and which thereby offers support for the prosthesis against diastolic aortic pressure, thus relieving the fixation sutures from excessive stress, fatigue and eventual rupture with the consequence of a loosening valve prosthesis.

It is a further object of this invention to provide a cusp supporting cone-shaped ring which is so designed that the cusps respond to the deformation of the ring. Further, it is an object of this invention to provide a cone-shaped cusp supporting ring which deforms in response to the contraction of the heat muscle with the result that the cusps similarly respond to the contraction of the heart muscle.

It is a further object of this invention to provide a prosthetic valve whose cusps are formed to eliminate clotting; the cusps having smooth curved surfaces and being formed in such a manner that a flushing action occurs upon closing of the valve and the formation of back pressure on the outflow side of the valve. The inflow side also presents smooth curved surfaces to the flow of blood and eliminates pockets and other clot forming areas.

It is a further object of this invention to provide a prosthetic valve which lends itself to the techniques of insertion whereby it may readily be inserted in the aortic annulus.

These and other objects and advantages of my invention will be apparent from the following specification taken in conjunction with the accompanying drawing in which:

FIGURE 1 is a perspective view of a valve incorporating my invention;

FIGURE 2 is a section taken along the line 2—2 of FIGURE 3 showing one of the cusps in cross-section and illustrating the manner of securing the cusps to the outer ring and the manner of securing the suture band to the exterior of the ring;

FIGURE 3 is a plan view illustrating the valve in normal partially closed position, in dotted lines. This is the condition in which one finds my valve before it is positioned in the aortic root. FIGURE 3 also shows the valve in fully closed position, in full lines, which is the condition of the valve when the same is positioned in the aortic root and normal aortic pressure is exerted upon the apexes of the supporting ring;

FIGURE 4 is a plan view of my valve illustrating the same in normal partially open position, in full lines, upon the application of aortic pressure upon the bases of the lobes of the supporting ring;

FIGURE 5 is a cross sectional view taken along the line 5—5 of FIGURE 4 and illustrates the cusps in partially spaced position resulting from aortic pressure upon the bases of the lobes of the supporting ring; and FIGURE 6 is a sectional view of an aorta showing my valve in position.

As illustrated in the drawings, my prosthetic valve consists of three substantially identical cusps or membranes 10, 11, and 12 whose shape duplicates as closely as possible the cusps of a normal aortic valve within the limitations imposed by the materials used and by the functions which a valve of this type must perform.

Each of the cusps 10, 11, and 12 is formed to provide smooth curved concave upper surfaces 13 and smooth curved convex lower surfaces 14. The shape of the cusps may be said to be, generally, triangular in plan and conform generally to a segment of a sphere. One side 10–A, 11–A and 12–A of each cusp 10, 11, and 12 is supported by the rim or ring 17 which will more fully hereinafter be described and the other two sides or lips 15 of each cusp is in normal close contact with the cooperating or adjacent lips of the adjacent cusps to form a valve closing contact.

Each of the cusps is molded from a resilient and readily deformable material such as silicon rubber and, in each cusp, I incorporate a Dacron mesh member 16 which forms a reinforcing element.

Because of the design of the cusps and the selection of the material from which they are formed, the valve is normally in partially closed position with the lips 15 of the cusps in valve closing contact through substantially their entire length in three regions extending radially from the axis unless a force is applied to it tending to overcome this normal position.

When pressure is applied to the convex lower surfaces 14 of the cusps from below, such as the pressure of blood being pumped from the heart to the aorta, the cusps 10, 11, and 12 readily deform or collapse and the normally closed lips 15 of the cusps are separated and become spaced apart permitting the blood to flow between them.

When pressure is applied to the concave upper surfaces 13 of the cusps from above, such as the pressure of blood in the aorta tending to return to the heart, the cusps 10, 11, and 12 return to the normally closed position in which the adjacent lips 15 engage and cooperate to close the passageway and prevent the flow of blood from the aorta to the heart. This design has the added advantage of providing a quick closure of the cusps at the end of the contraction phase of the heart cycle. This is particularly important when the valve is of large diameter.

As previously pointed out, the three cusps 10, 11, and 12 are molded to the inner wall of a strip-like resilient rim 17 having a serpentine form as viewed in directions lateral of its axis whereby the rim in radial projection forms three substantially equal and connected arcuate portions. In other words, the ring 17 does not lie in a single transverse plane but is provided with three depending lobes. The areas of the ring at which adjacent lobes join will hereinafter be called the apexes of the ring and the lowermost portions of the lobes will hereinafter be called the base of the lobe. The outer peripheral surface of the ring or rim 17 is coincident with the surface of a truncated cone.

The ring or rim 17 is a functional duplicate of the aortic annulus and is adapted to be sutured tightly to the aortic root. The cusps 10, 11, and 12 are molded to the inner side of the ring 17 in smooth curves and, it will be noted, the smooth curved concave upper surfaces 13 join similar smoothly curved surfaces of the ring 17 with the result that those sides of the cusps and ring toward the aorta form smooth curves for the flow of fluid. The importance of this will more fully hereinafter be described. The smooth curved convex lower surfaces 14 and the adjacent portions of the ring 17 also present smooth curves and tend to form, as nearly as possible, smooth outflow surfaces from the ventricle. The importance of this feature will likewise more fully hereinafter be described.

The conical outer surface of the ring 17 is provided with a band 18 of plain Dacron mesh whose two edges are anchored or molded into the ring 17 at the time of its formation in the manner shown in FIGURES 2 and 5. The band 18 intermediate its edges is available to be engaged by surgical sutures whereby the valve may be fixed in the aortic annulus and also, after the surgical procedure, provides an area into which the body tissue may grow to provide a firm and permanent contact.

A ring of spring wire 21 is molded into the ring 17 when it is formed. The wire ring 21 enhances the resiliency of the ring 17 and, in addition, reinforces it.

The aortic annulus, after the removal of the diseased aortic valve, is cone-shaped and, therefore, is admirably adapted to accommodate and receive the cone-shaped ring 17.

As is indicated generally in FIGURE 3, when external pressure is applied to the apexes of the ring 17, the lips 15 are urged tightly into engagement with each other. Similarly, as is indicated in FIGURE 4, when pressure is applied to the bases of the lobes of the ring 17, the lips 15 are separated. Thus, when my valve has been inserted in the aortic annulus, pressure on the bases of the lobes, which occurs during the contracting phase of the heart muscle cycle, relaxes the cusps 10, 11, and 12 and enhances the ready and easy opening of the valve upon the application of minimum of pressure on the cusps. On the following phase of the cycle of the heart muscle, however, this pressure will be removed from the bases of the lobes of the ring 17. The cusps will then return to the full line position illustrated in FIGURE 3.

The prosthetic ring 17 is preferably designed to be as thin as possible in order to reduce to a minimum the space which it occupies. In addition to providing the greatest possible opening for the passage of blood, the provision of a thin wall for the ring 17 reduces the possibility of clotting by removing or reducing the areas within which clotting may occur. This thinness of the ring 17 and the provision of smooth curved surfaces for the cusps and the adjacent surfaces of the ring 17 reduces the possibility of clotting by removing or reducing the areas within which clotting may occur. Moreover, the provision of a smooth curved concave surface on the outflow or aorta side of the valve results in a flushing or scavenging action or motion by the blood.

The slight elastic pressure of the ring 17 and the elasticity of the material from which it is made will make a tight seal between the outer conical surface of the ring 17 and the aorta and heart tissue.

The open Dacron mesh 18 provides an area for suturing final fixation of the prosthesis by tissue growing into the mesh.

The use of the valve may briefly be described as follows: After preliminary procedures, the aorta is exposed and the diseased valve resected. Sutures are placed in the annulus at the desired level in the aortic root. As has been pointed out, the conical shape of the ring 17 makes it admirably adapted for insertion in the corresponding conical aortic passageway and the flexibility of the ring 17 facilitates the positioning of a valve of the right size into the aorta below the coronary ostia into the lower portion of the sinus valsalvae covering the anatomical insertion line of the diseased and resected cusps.

The valve is positioned, as illustrated in FIGURE 6, with the convex sides 14 of the cusps 10, 11, and 12, positioned toward the ventricle of the heart and with the concave sides 13 of the cusps 10, 11 and 12 positioned toward the aorta. The surgical technique will not be described in detail since the same does not constitute a part of my invention. However, the sutures are tied and the aorta is closed. Thereafter, on the contracting phase of the heart muscle, blood will be forced, under pressure, against the smoothly curved lower convex sides 14 of the cusps 10, 11, and 12 and similar muscular pressure will be exerted generally inwardly on the bases of the lobes of the ring 17. The pressure of the blood on the lower convex surfaces of the cusps 10, 11, and 12 will cause them to collapse with the result that their lips 15 will be separated permitting the flow of blood therebetween into the aorta. This collapse and the separation of the lips 15 will be enhanced by the muscular pressure upon the bases of the lobes of the rings 17 which, as has previously been pointed out, enhances the collapsing of the cusps and the opening or separation of their lips 15.

The following muscular action of the heart eliminates the pressure of blood on the lower sides 14 of cusps 10, 11, and 12, and, similarly relaxes the muscular pressure upon the bases of the lobes of the ring 17. The resiliency of the material of which the cusps are formed and their design will cause the cusps to assume a normal position which, as was previously pointed out, results in normal closing of the valve. An increase in pressure on the aortic side is transmitted to the smoothly curved upper surfaces 13 of the cusps 10, 11, and 12 tending to urge their lips 15 into tight intimate and sealing contact.

Because of the smooth curved surfaces of the cusps and the adjacent smooth curved surfaces of the ring 17, the passage of blood from the heart to the aorta is accomplished with a minimum of resistance and with a minimal chance of clotting by the substantial elimination of any area in which clotting can occur. Similarly, the smooth curved upper concave surfaces 13 of the lobes 10, 11 and 12 and the adjacent areas of the ring 17 provide a cleansing or scavenging motion to the blood and thus prevents clotting. Subsequent action of the heart valve results in a repeated opening and closing of the valve.

These clot preventing properties of the valve might be enhanced by coating the resilient material, such as silicon rubber, with an electrically conductive material such as gold, silver, or graphite in molecular film.

It will be apparent that minor changes may be made in my device both in the selection of the materials and in the specific shaping of the various parts all, without departing from the spirit of my invention and it is to be understood that all such modifications and alterations fall within the terms of the appended claim.

I claim:

In a valve adapted for insertion into a human heart, mounting means comprising a strip-like rim formed of flexible material and having a serpentine form as viewed in directions lateral of its axis whereby the rim in radial projection forms substantially equally connected arcuate portions, said rim also being formed whereby normally its outer peripheral surface is generally coincident with the surface of a cone whereby the area enclosed by one edge of the rim is smaller than the area enclosed by the other edge of the rim, and valve means carried by said rim, said valve means comprising three membranes each formed of resilient plastic material, each membrane normally conforming generally to a segment of a sphere and having one edge thereof attached to the corresponding arcuate portion of the rim, said three membranes being dimensioned and disposed whereby inwardly extending marginal portions of the same are urged together into valve closing contacts in three regions extending radially from said axis to the rim and displaced at substantially equal angles with respect to each other, the convex sides of said membranes facing in a direction toward said smaller area.

References Cited by the Examiner

UNITED STATES PATENTS 2,571,721 10/51 Jardon _____ 3—13
2,682,057 6/54 Lord _____ 3—1
2,822,819 2/58 Geeraert _____ 3—1 X

OTHER REFERENCES

Annals of Surgery, volume 147, No. 5, May 1958, pages 636–645.

Annals of Surgery, volume 154, No. 4, October 1961, pages 726–740.

RICHARD A. GAUDET, *Primary Examiner.*